United States Patent [19]

Makino

[11] 4,293,077

[45] Oct. 6, 1981

[54] CONTAINER HANDLING APPARATUS

[75] Inventor: Kazuhiro Makino, Kudamatsu, Japan

[73] Assignee: Hitachi, Ltd., Tokyo, Japan

[21] Appl. No.: 66,237

[22] Filed: Aug. 13, 1979

[30] Foreign Application Priority Data

Aug. 30, 1978 [JP] Japan .............................. 53-104924

[51] Int. Cl.[3] ...................... B66C 17/00; B65G 67/60

[52] U.S. Cl. .................................. 212/219; 212/147; 414/139

[58] Field of Search ............... 414/139, 340, 344, 348, 414/561; 212/11, 14, 213, 218, 219, 220, 147

[56] References Cited

U.S. PATENT DOCUMENTS

| | | | |
|---|---|---|---|
| 3,812,987 | 5/1974 | Watatani | 414/139 X |
| 4,106,639 | 8/1978 | Montgomery et al. | 414/139 |
| 4,160,617 | 7/1979 | Montgomery et al. | 414/139 |
| 4,172,685 | 10/1979 | Nabeshima et al. | 414/139 |

FOREIGN PATENT DOCUMENTS

| | | |
|---|---|---|
| 50-141062 | 11/1975 | Japan . |
| 51-41273 | 11/1976 | Japan . |
| 53-26301 | 7/1978 | Japan . |

*Primary Examiner*—Jeffrey V. Nase

*Attorney, Agent, or Firm*—Craig and Antonelli

[57] ABSTRACT

A container handling apparatus is formed of a travelling container crane, a self-supporting portal frame supported by wheels, a connector connecting the container crane with the portal frame, container receiving device provided on the portal frame and container elevating device provided on the portal frame, thereby the container crane handles a container to the container receiving means provided on the portal frame, the container is handled from the container receiving device to the container elevating device, and the operation efficiency is increased between the container crane and the container elevating device, a contact point of each handling path is fixed by the connector not to be discrepant each other so as to maintain continuity of the handling paths, further, during handling operation, a load received by the container handling apparatus is prevented to transmit concentrically to the container crane by the self-supporting portal frame, and that a large number of the containers may be handled in a short period of time without unreasonable use of the container crane.

2 Claims, 2 Drawing Figures

CONTAINER HANDLING APPARATUS

BACKGROUND OF THE INVENTION

The present invention relates to apparatus for handling containers by the increased handling efficiency of a crane.

Known container cranes are provided with a hanger which hitches the container so as to move in horizontal and vertical directions.

For instance, when the container crane handles the container from a container transport ship to a quay, the containers on the container transport ship are hitched by the hanger, the hanger is moved in vertical and horizontal directions, and the container is deposited on a desired position of the quay. After the container is deposited on the desired position, the hanger is released from the container and is returned toward the container transport ship.

In such container handling operation, as is often experienced, the container crane can not handle the container during the time the crane with its hanger returns to the container transport ship.

If the return path of the hanger is long then the number of the containers handled during a given period may become small and the handling efficiency of the containers decreases. Therefore, there is a demand to solve the above difficulty.

In order to solve the difficulty one problem encountered in handling containers by means of a container crane is how to handle as many containers as possible in a short period of time. One solution that comes to mind is to increase the number of times the hanger hitches containers per unit time by shortening the path of movement of the hanger of the container crane in the air. Methods known in the art for handling containers on the basis of the concept mentioned hereinabove will presently be described.

One of such methods consists in depositing a container hung from the hanger on a container receiving truck provided to the container crane for horizontal movement and moving the hanger to hitch another container. The container thus deposited on the container receiving truck is further deposited in a desired location on the ground by the horizontal movement of the container receiving truck and by means of a yard crane provided independently of the container crane. In this method, the path of movement of the hanger of the container crane is shortened by eliminating from such path a portion thereof between the container receiving position of the container receiving truck and the desired unloading position on the ground, thereby increasing the operation efficiency of the container crane and its yield.

Another method known in the art envisages the provision of a space for temporarily depositing a container on the container crane itself so that the hanger of the container crane can be returned to its place of origin for handling another container after depositing the container in such space. The container deposited in such space is further deposited in a desired location on the ground by means of an auxiliary container handling device supported on the container crane. In this method, shortening of the path of movement of the hanger of the container crane is achieved by eliminating from the path of movement of the hanger a portion thereof between the space for temporarily depositing a container on the container crane and the desired unloading position on the ground, thereby increasing the operation efficiency of the container crane and its yield.

A third method known in the art calls for using another travelling frame independently of the container crane and disposed rearwardly thereof, so as to provide the space for temporarily depositing a container and support the auxiliary container handling device described by referring to the second method. This method makes it possible to achieve shortening of the path of movement of the hanger of the container crane in the same manner as the second method.

In the first method of the prior art, the load applied to wheels of the container crane would increase because the container crane supports the container receiving truck. Thus incorporation of the first method in a container crane already constructed makes it necessary to remodel the container crane on a large scale. Moreover, since the container crane and the yard crane are independent of each other, it is necessary to bring them into suitable relative positions for handling containers in cooperation with each other. This might mean a delay in the time for starting a container handling operation. An added trouble is that the yard crane should be moved to position same in a suitable location when the container crane travels to a location where further container handling operation is going to be performed.

Since the container crane provides thereon the space for temporarily depositing a container and supports thereon the auxiliary container handling device when the second method of the prior art is adopted, the container crane would become too heavy and wheels of the container crane would have to support a heavy load. Thus it is extremely difficult to remodel an existing container crane along the lines suggested by this method.

Adoption of the third method of the prior art, although no increase in the load applied to wheels of the container crane is involved, would make it necessary to bring the container crane and another crane into suitable relative positions for handling containers, in the same manner as described by referring to the first method of the prior art. Thus this method would have the disadvantages that the time for initiating a container handling operation is delayed and that positioning of the container crane relative to another crane should be effected each time the container crane is moved to change places for handling containers during the course of its operation.

It will become apparent that other problems encountered in carrying into practice the aforementioned three methods of the prior art can be solved by the present invention, when the description of a preferred embodiment thereof is considered.

SUMMARY OF THE INVENTION

This invention has as its object the provision of a container handling apparatus capable of expediting initiation of a container handling operation which can be used in association with an existing container crane to increase the yield of the container crane.

According to this invention, these and other objects have been attained by a container handling apparatus comprising, a self-supporting portal frame connected to a container crane capable of travelling, leg portions of said portal frame being provided on travelling wheels, said self-supporting portal frame including a container transfer space and an elevating device for moving a container vertically.

According to the apparatus of this invention, it is preferable that a truck for accommodating a container transport vehicle be located relative to the deposited position of the containers and that the truck be connected to one of the container crane and the portal frame. Further, it is preferable that the portal frame be provided with guides to lead the container at the desired position.

DESCRIPTION OF THE PREFERRED EMBODIMENT

Figure 1:
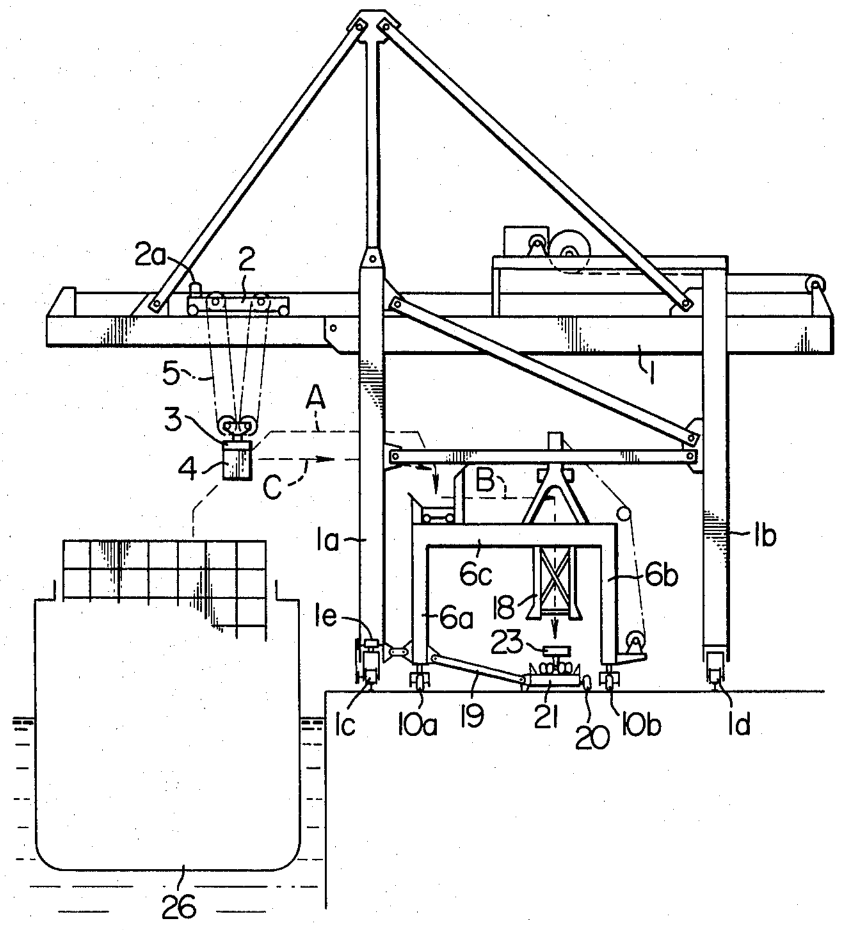
FIG. 1 is a side view of the container handling apparatus in its entirety comprising one embodiment of the present invention to fit for a use purpose for handling the container between the container transport ship and the container transport vehicle.

A preferred embodiment of the present invention will now be described to be made preferably for transshipping of the containers between the container transport ship and the container transport vehicle by referring to FIGS. 1 to 2.

A hanger 3 suspended by rope 5 from a trolley 2 capable of moving by a driving force of a motor 2*a* along an overhead girder 1 of a container crane disposed across the length of a container transport ship 26 can hitch a container. With the container 4 hung from the hanger 3, the trolley 2 can move from the ship 26 to the shore or in the reverse direction. The overhead girder 1 is supported by an elongated leg 1*a* near the water and an elongated leg 1*b* remote from the water, the container crane itself can travel on rails of the quay to drive rotatably wheels 1*c* and 1*d* by a motor 1*e*.

A portal crane 6 supported on wheels 10*a* and 10*b* is located between the legs 1*a* and 1*b* on the quay and includes a portal frame comprising legs 6*a* and 6*b* to which the wheels 10 and 10*b* are attached, and a horizontal girder 6*c* supported by the legs 6*a* and 6*b* and disposed at a lower level than the overhead girder 1. Located on the horizontal girder 6*c* are a guide for guiding a container and a container elevating device, the guide being nearer to the leg 1*a* than the container elevating device. Horizontal transfer means capable of moving in reciprocatory movement between the guide and the container elevating device is also located on the horizontal girder 6*c*.

The guide for guiding a container includes upstanding container guide members 7*a* and 7*b* disposed in spaced juxtaposed relation on the horizontal girder 6*c*. The container guide member 7*a* of smaller height is disposed at the left end of the horizontal girder 6*c* in FIGS. 1 and 2, and the container guide member 7*b* of larger height is disposed in a position on the horizontal girder 6*c* which is spaced apart from the position of the container guide member 7*a* a distance large enough to place the container 4 therein. The container guide member 7*a* of smaller height serves concurrently as a stopper for positioning a container receiving truck 8 subsequently to be described. The container guide member 7*a* of smaller height has attached to its top an inclined surface plate 4*a* whose surface is inclined toward the container guide member 7*b*, while the container guide member 7*b* of larger height has attached to its top an inclined surface plate 4*b* whose surface is inclined toward the container guide member 7*a* of smaller height. A space large enough to permit the container receiving truck 8 to move therethrough is formed below the inclined surface plate 4*b*.

The container elevating device located on the horizontal girder 6*c* includes a winding frame member 14, which is supported by two legs 14*a* and 14*b* disposed upright on the horizontal girder 6*c*, container guide means 18 extending downwardly from the horizontal girder 6*c*, a container hanger 17 capable of moving vertically through the container guide means 18, and winding means 15 for moving the container hanger 17 vertically. The winding means 15 includes a winding drum 15*a* having rope 16 wound thereon and trained over sheaves mounted at the right end of the horizontal girder 6*c* (FIG. 2) and at the top of winding frame member 14, to hang the container hanger 17. The container guide means 18 includes four guide members 18*a*, 18*b*, 18*c* and 18*d* for guiding the four corners of the container hanger 17 in its vertical movement. The guide members 18*a*, 18*b*, 18*c* and 18*d* are reinforced by struts connected to the horizontal girder 6*c*. The winding means 15 is supported on a bracket secured to lower end portion of the leg 6*b*, and is operative to rotate the winding drum 15*a* to wind the rope 16 thereon and to pay out the rope 16 therefrom, to thereby move the container hanger 17 vertically.

The horizontal transfer means provided on the horizontal girder 6*c* may be in the form of a conveyor, a truck or a roller transport. Also, the winding frame member 14 and the legs 14*a* and 14*b* may be moved along the horizontal girder 6*c* to serve as horizontal transfer means. In the embodiment shown and described herein, the horizontal transfer means is in the form of a truck. The container receiving truck 8 for supporting the container 4 is equipped with wheels 11 for movement on rails along the horizontal girder 6*c*. Drive means 13 for the container receiving truck 8 is supported on a bracket secured to an upper end portion of the leg 6*b* for rotating through a chain 13*a* a drive chain sprocket 12*a* secured to the right end of the horizontal girder 6*c*. A chain 12 trained over the drive chain sprocket 12*a* and a driven chain sprocket 12*b* secured to the left end of the horizontal girder 6*c* transmits the rotation of drive chain sprocket 12*a* as a tensile force to the container receiving truck 8 to which the chain 12 is connected, so that the container receiving truck 8 can move along the horizontal girder 6*c* by virtue of the tensile force transmitted thereto. When the rotation of the drive chain sprocket 12*a* is reversed, the container receiving truck 8 can be moved in the reverse direction. The range of movement of the container receiving truck 8 should cover at least the distance between the left end of the horizontal girder 6*c* and the winding frame member 14.

A truck 21 is supported on wheels 20 for movement on the quay and has thereon an area for supporting a container transport vehicle 23. The truck 21 is inclined at its front and rear ends to faciliate the movement of the container transport vehicle 23 thereinto, as shown in FIG. 2. Guides 22 are disposed on opposite sides of the truck 21 for regulating the position of the container transport vehicle 23 widthwise of truck 21.

The guides 22 are located in spaced juxtaposed relation and inclined toward each other. The spacing between the inner ends of the guides 22 is equal to the width of the container transport vehicle 23. Thus when the container transport vehicle 23 moving onto the truck 21 is off-center relative to the truck 21, wheels 27 on one side of the truck 21 will mount the inclined surface of one of the guides 22. When this is the case, the wheels 27 slide down along the inclined surface of the guide 22 by gravity, thereby positioning the container transport vehicle 23 on the truck 21.

The truck 21 has stoppers 25 located at one end thereof for regulating the position of the container transport vehicle 23 on the truck 21 with respect to the direction of movement of the vehicle 23. The stoppers 25 can be moved between a standing position and a lying position by cylinders 24. When the container transport vehicle 23 is positioned on the truck 21, the stoppers 25 are moved to the standing position in which they abut against the forward wheels 27 of the container transport vehicle 23, thereby keeping the vehicle 23 in the predetermined position with respect to the direction of its movement. When the container transport vehicle 23 is discharged from the truck 21, the stoppers 25 are moved to the lying position, to allow the vehicle 23 to be driven out of the truck 21 onto the quay.

The truck 21 and portal crane 6 are connected to the container crane, either directly or indirectly, as will be described hereinafter.

The truck 21 is brought to a position such that the container transport vehicle 23 positioned thereon is disposed immediately below the container guide means 18. When in this position, the truck 21 is connected to the leg 6*a* by means of a link 19 secured at opposite ends thereof to the truck 21 and leg 6*a* through pins to allow the link 19 to move vertically in pivotal movement. The leg 6*a* is connected to the elongated leg 1*a* of the container crane near the water by means of a link 9 secured at opposite ends thereof to legs 6*a* and 1*a* through pins to allow the link 9 to move vertically in pivotal movement. By removing one of the pins, the link 9 can be released from the elongated leg 1*a* to permit the container crane to move by itself.

In one embodiment of the present invention constructed as described hereinabove, the operation of discharging containers from the container transport ship 26 alongside the quay and loading each container on the container transport vehicle 23 will now be described. The container 4 is moved along a path indicated by arrows A and B in FIG. 1, after it is removed from the ship 26. First, the container 4 aboard the container transport ship 26 is hitched by the hanger 3 suspended from the trolley 2 by the rope 5 and moved upwardly as the rope is manipulated. After being lifted to a suitable level, the container 4 is moved to a position above the container receiving truck 8 interposed between the container guide members 7*a* and 7*b*, as the trolley 2 moves along the overhead girder 1. Upon the container 4 reaching the aforesaid position above the container receiving truck 8, the rope 5 is manipulated to move the hanger 3 and container 4 downwardly. During its downward movement, the container 4 is guided by the inclined surface plate 4*b* attached to the top of the container guide member 7*b* of larger height, so that the position of the right side of the container can be adjusted. Further downward movement of the container 4 brings the same into engagement with the inclined surface plate 4*a* at the top of the container guide member 7*a* of smaller height to be guided thereby, so that the position of the left side of the container 4 can be adjusted. After the position of the container is adjusted in this way, the container 4 is guided by the container guide members 7*a* and 7*b* to be deposited accurately in a predetermined position on the container receiving truck 8. The provision of container guide members 7 and 7*b* eliminates the need to effect fine adjustments of the position of the trolley 2 before the container 4 is deposited on the container receiving truck 8. To shorten the path of movement of the container 4 from the ship 26 to the container receiving truck 8, the level to which the container 4 is lifted by manipulating rope 5 may be reduced as indicated by an arrow C in FIG. 1. When this is the case, the container 4 may be first brought into engagement with the container guide member 7*b* during its movement parallel to the horizontal girder 6*c* and then moved downwardly along the container guide member 7*b*, by utilizing the difference in height between the two container guide members 7*a* and 7*b*.

Upon the container being deposited on the container receiving truck 8, the hanger 3 is unhitched and moved toward the container transport ship 26 as the trolley 2 is moved in that direction, to hitch another container. During the time to return to the quay side the hanger 3 performs the operation of hitching another container and moving the container to the position above the space below the container guide member 7*b*, the container 4 on the container receiving truck 8 is hitched by the hanger 17 and moved downwardly onto the container transport vehicle 23. This operation will be described hereinafter.

First, the winding means 15 is actuated to move the hanger 17 to its uppermost position and hold the same in that position by winding the rope 16 on the winding drum 15*a*. Then, the container receiving truck 8 is moved to a position below the hanger 17 by actuating the drive means 13 to pull the chain 12. When the container receiving truck 8 is below the hanger 17, the container 4 on the container receiving truck 8 is below the hanger 17. When the container 4 and the hanger 17 are in the aforesaid relative positions, the hanger 17 is moved downwardly by actuating the winding device 15 to pay out the rope 16, so that the hanger 17 will hitch the container 4 when the former is brought into engagement with the latter. After the container 4 is hitched by the hanger 17, the winding device 15 is actuated to move the container 4, through the chain 12, slightly upwardly away from the container receiving truck 8, and then the drive means 13 is actuated to allow the container receiving truck 8 to be moved, through the chain 12, to a position in which the truck 8 is in contact with the container guide member 7*a*. Thus the container receiving truck 8 is ready to receive another container from the hanger 3 and deposit the same thereon. Meanwhile, during the time the container receiving truck 8 supporting thereon the next following container moves again to the winding frame member 14, the container 4 hitched by the hanger 17 is moved downwardly onto the container transport vehicle 23.

Figure 2:
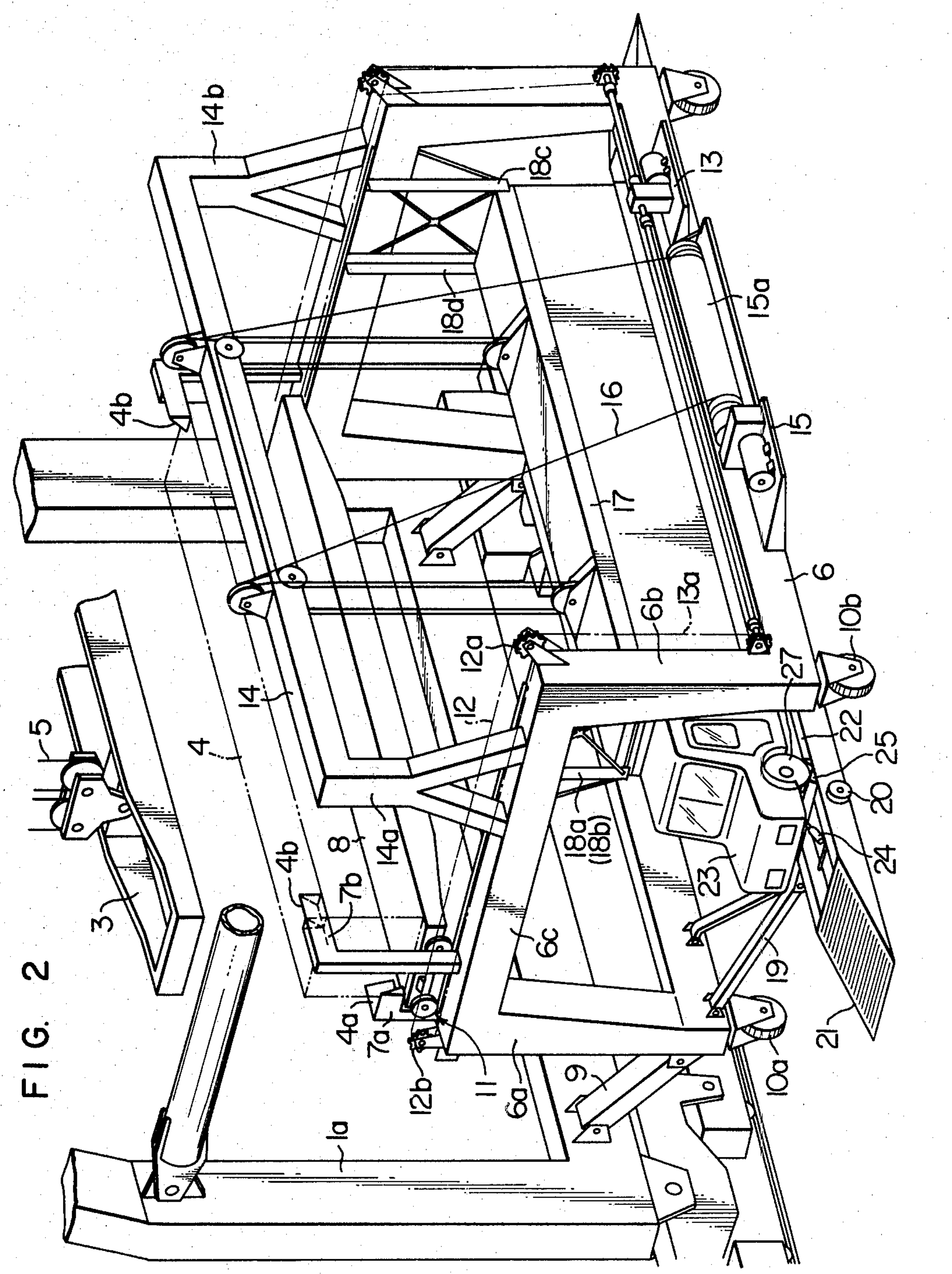
FIG. 2 is a detailed perspective view showing, on an enlarged scale, the portal frame shown in FIG. 1 and its vicinity.

As shown in FIG. 2, the container transport vehicle 23 can move onto the truck 21 without any trouble by utilizing one of the inclined surfaces at opposite ends of the truck 21. Simultaneously as the container transport vehicle 23 is fully supported on the truck 21, the cylinders 24 are actuated to move the stoppers 25 to the standing position, to thereby regulate the forward wheel positions. The position of the container transport vehicle 23 widthwise of the truck 21 is regulated by the guides 22 on opposite sides thereof. Thus, the container support platform of the container transport vehicle 23 on the truck 21 is disposed immediately below the container guide means 18 and hence the container 4.

After the container transport vehicle 23 is positioned on the truck 21 as aforesaid, the winding means 15 is actuated to pay out the rope 16 to move the hanger 17 and container 4 downwardly. During its downward movement, the container 4 hitched by the hanger 17 is guided by the container guide members 18*a*, 18*b*, 18*c* and 18*d* so as to prevent the horizontal movement of the container 4. Thus, the container 4 hanging from the hanger 17 is free from swinging movement. The container 4 moving downwardly while being guided by the container guide members 18*a*, 18*b*, 18*c* and 18 *d* is deposited on the container support platform of the container transport vehicle 23. Since the container 4 is prevented from swinging during its downward movement, the container 4 is deposited accurately in a predetermined position on the container support platform. Particularly, since the position of the container transport vehicle 23 on the truck 21 is regulated by the guides 22 and stoppers 25, it is possible to increase the accuracy with which the container 4 is deposited in the predetermined position on the container receiving platform of the container transport vehicle 23. When the container 4 is deposited on the container transport vehicle 23, there is no need to perform a container swinging preventing operation and an operation for adjusting the position of the container transport vehicle 23 carried out by using the power of the vehicle 23. Thus the depositing of the container 4 on the container transport vehicle 23 is expedited.

Following depositing of the container 4 on the container transport vehicle 23, the hanger 17 is unhitched from the container 4 and moved upwardly, by actuating the winding means 15 to wind the rope 16, to the uppermost position where the hanger 17 is held. Thus the hanger 17 is ready to receive in the position below it the container receiving truck 8 supporting the next following container thereon. When the hanger 17 is unhitched from the container 4 as aforesaid, the stoppers 25 are brought to the lying position by the cylinders 24, thereby permitting the container transport vehicle 23 to run over the stoppers 25. Then the container transport vehicle 23 is moved from the truck 21 to the quay by utilizing one of the inclined surfaces of the truck 21, to allow the next following container transport vehicle to move onto the truck 21 and receive thereon the next following container.

In this way, one cycle of operation for discharging the container 4 from the container transport ship 26 by transshipping same from the ship to the container transport vehicle 23 is completed.

In this cycle of operation for discharging the container 4 from the ship 26 and transshipping same to the container transport vehicle 23, the hanger 3 merely moves between the ship 26 and the container guide members 7*a* and 7*b*, without taking part in the operation of depositing the container 4 on the container transport vehicle 23. This makes it possible to increase the number of containers discharged from the ship per unit time. The provision of the container guide members 7*a* and 7*b* and the container guides 18*a*, 18*b*, 18*c* and 18*d* enables the container 4 to be deposited automatically in the predetermined position on the container receiving truck 8 and the container transport vehicle 23 whose position on the truck 21 is automatically regulated by the stoppers 25 and guides 22. Since it is possible to deposit the container 4 rapidly and accurately on the container receiving truck 8 and container transport vehicle 23, transshipping of the container 4 from the container transport ship 26 to the container transport vehicle 23 can be achieved in a short period of time, thereby increasing the operation efficiency and yield of the hanger 3 of the container crane, the hanger 17 of the container elevating device, and the container receiving truck 8.

When the containers in the portion of the container transport ship 26 which is within the range of operation of the trolley 2 of the container crane in its current position have all been handled and discharged from the ship 26, the container crane is moved to change the places for handling the containers. As the container crane moves, the force of movement thereof is transmitted to the portal crane 6 and truck 21 by way of the links 9 and 19 respectively. Thus, the portal crane 6 and truck 21 move following the container crane without altering their relative positions with the container crane. Therefore, even when the container crane is moving, the container existing on the portal crane 6 can be transshipped quickly and positively to the container transport vehicle 23, thereby making it unnecessary to interrupt transshipping of the container 4 to the container transport vehicle 23 while the container crane is moving. This enables a large number of containers to be transshipped from the container ship to container transport vehicles in a short period of time.

The portal crane 6 and truck 21 that travel with the container crane are equipped with wheels 10*a* and 10*b* and 20 respectively on which they travel. Thus the load applied to the wheels 1*c* and 1*d* supporting the container crane is not affected by the weight of the portal crane 6 and truck 21 which travel together with the container crane. It will be apparent, therefore, that by connecting the portal crane 6 and truck 21 to an existing container crane it is possible to shorten the time required for carrying out a container handling operation without requiring reinforcement or remodelling of the container crane on a large scale. Since the links 9 and 19 connecting the portal crane 6 and truck 21 to the container crane can be moved vertically in pivotal movement, the vertical movement of the portal crane 6 or truck 21 due to irregularities of the surface of the road on the quay would not affect the movement of the container crane. Also, the shock which might otherwise be produced when the container 4 is deposited on the container receiving truck 8 or container transport vehicle 23 would be absorbed by tires of the wheels 10 of portal crane 6 or the wheels 20 of truck 21, thereby eliminating application of excessively large shock to the container crane. Thus it is possible to carry out a container handling operation in a short period of time without remodelling an existing container crane on a large scale.

An added advantage offered by the present invention is that since the relative positions of the container crane and the portal crane 6 and container transport vehicle 23 are kept constant at all times by the links 9 and 19, container handling can be readily automated. Particularly, the provision of different types of container guides to the portal crane 6 eliminates the need to effect positioning of the container 4 when the latter is deposited on the container receiving truck 8 and container transport vehicle 23 even if the container 4 moves in swinging movement during its movement in the air, thereby further facilitating automation of container handling.

In the embodiment shown and described hereinabove, the container handling apparatus has been described as being used in discharging containers from a container transport ship. It will be apparent that loading of a container transport ship with containers can be achieved by reversing the process described with reference to discharging of containers from the container transport ship.

What is claimed is:

1. A container handling apparatus comprising:

a container crane with elongated legs capable of travelling, a self-supporting portal frame having leg portions and being disposed within a region defined by said elongated legs of said container crane, travelling wheels being mounted to said leg portions of said portal frame, connecting means being connected between said portal frame and said container crane, said portal frame comprising an elevating device thereon and a container transfer space, said portal frame further comprising first and second pluralities of guides located in the vicinity of said container transfer space, wherein said second plurality of guides comprises a plurality of low guides disposed remote from said elevating device and a plurality of high guides more proximate to said elevating device, whereby a container delivered to said guides by said container crane is first positioned by said high guides.

2. A container handling apparatus comprising:

a container crane with elongated legs capable of travelling, a self-supporting portal frame having leg portions and being disposed within a region defined by said elongated legs of said container crane, travelling wheels being mounted to said leg portions of said portal frame, connecting means being connected between said portal frame and said container crane, a container elevating device being securely disposed to said portal frame, a container horizontal transfer means being disposed to said portal frame, a first guide means being projected downward from said portal frame at a position to deposit a hitched container by means of said elevating device, a second guide means being projected upward from said portal frame at a position to deposit the hitched container by means of said container crane, one side of said second guide means having lower height and being farther from said elevating device than the other side of said second guide means, and a transfer space for said container located below said second guide means.

* * * * *